(12) United States Patent
Fini et al.

(10) Patent No.: US 9,110,351 B2
(45) Date of Patent: Aug. 18, 2015

(54) NON-LINEAR FIBER RESISTANT TO PERTURBATIONS

(75) Inventors: John M Fini, Metuchen, NJ (US); Lars Gruner-Nielsen, Copenhagen (DK); Dan P Jakobsen, Soutbridge, MA (US)

(73) Assignee: OFS FITEL, LLC, Norcross, GA (US)

( * ) Notice: Subject to any disclaimer, the term of this patent is extended or adjusted under 35 U.S.C. 154(b) by 0 days.

(21) Appl. No.: 14/127,437

(22) PCT Filed: Jul. 9, 2012

(86) PCT No.: PCT/US2012/045993
§ 371 (c)(1),
(2), (4) Date: Dec. 18, 2013

(87) PCT Pub. No.: WO2013/006868
PCT Pub. Date: Jan. 10, 2013

(65) Prior Publication Data
US 2014/0119700 A1 May 1, 2014

Related U.S. Application Data

(60) Provisional application No. 61/505,433, filed on Jul. 7, 2011.

(51) Int. Cl.
*G02B 6/00* (2006.01)
*G02B 6/036* (2006.01)
*G02F 1/365* (2006.01)
*G02B 6/028* (2006.01)

(52) U.S. Cl.
CPC .............. *G02F 1/365* (2013.01); *G02B 6/028* (2013.01); *G02B 6/03638* (2013.01)

(58) Field of Classification Search
CPC .......... G02B 6/03644; G02B 6/03627; G02B 6/03611; G02B 6/02261; G02B 6/03688; G02F 1/365; G02F 1/377; G02F 1/3775; G02F 1/383
USPC ..................................... 385/122, 127
See application file for complete search history.

(56) References Cited

U.S. PATENT DOCUMENTS

| | | | | |
|---|---|---|---|---|
| 5,035,481 A | * | 7/1991 | Mollenauer | 398/80 |
| 2003/0007760 A1 | * | 1/2003 | Goyal et al. | 385/123 |
| 2006/0244949 A1 | * | 11/2006 | Chen et al. | 356/73.1 |
| 2007/0053641 A1 | * | 3/2007 | Hirano et al. | 385/124 |

* cited by examiner

*Primary Examiner* — Jerry Blevins
(74) *Attorney, Agent, or Firm* — Michael P. Kochla, Esq.

(57) ABSTRACT

Embodiments of the present invention relate to a fiber design that achieves high nonlinearity, an effective index providing phase matching for an illustrative wavelength conversion process, and a low sensitivity to perturbations in fiber scaling. In one embodiment, a fiber comprises an inner core having an inner core radius and an inner core index, an outer core having an outer core radius and an outer core index, the outer core index being lower than the inner core index, an inner cladding, having an inner cladding radius and an inner cladding index, the inner cladding index being less than the outer core index, and an effective index of the fiber, the effective index being greater than the inner cladding index and less than the outer core index, wherein the fiber has a low perturbation sensitivity factor of dispersion to scaling less than about 20 ps/nm/km along the length of the fiber.

9 Claims, 13 Drawing Sheets

NON-LINEAR FIBER RESISTANT TO PERTURBATIONS

CROSS-REFERENCE TO RELATED APPLICATIONS

The present application claims priority to U.S. Provisional Patent Application No. 61/505,433, entitled "Non-Linear Fiber Resistant to Perturbations," filed Jul. 7, 2011, the disclosure of which is incorporated by reference herein in its entirety.

BACKGROUND

1. Field of the Invention

Embodiments of the present invention generally relate to non-linear fibers resistant to perturbations. More specifically, embodiments of the present invention relate to a fiber design that achieves high nonlinearity and a low sensitivity to perturbations in fiber scaling.

2. Description of the Related Art

Nonlinear optical devices are useful in numerous applications, including wavelength conversion, signal regeneration, spectral inversion, and low-noise amplification. These applications are often based on a parametric amplification process. Generally, the overall performance of a nonlinear device is closely related to the properties of the waveguide therein. For most applications, silica-based fibers offer the best properties, largely based on the balance between loss and nonlinearity offered thereby, of any available waveguide platform. However, because the nonlinearity of silica is low, the fiber length must be quite long (typical in the range 50-1000 meter or even longer) in many cases to allow significant nonlinear effects to accumulate at reasonable optical power. For numerous applications, such excessive length may lead to undesirable optical effects downstream.

For parametric amplification applications, a fiber must satisfy phase-matching conditions relating to the effective index values at the interacting optical wavelengths. It has recently been shown that there is significant variation in the effective index of guided light over the length of the fiber, and that variation of the effective index can cause significant degradation of phase matching over long lengths of fiber. As such, there is a significant design problem to achieve several fiber mode properties simultaneously. Some of these most relevant properties include: high nonlinearity, so that the length of fiber and/or input power can be reduced; an effective refractive index versus wavelength balance that allows phase matching of the desired nonlinear process in an unperturbed fiber; and low sensitivity of the phase matching to variations along the fiber length, i.e., scaling. This problem is especially difficult because existing fiber designs which achieve high nonlinearity are particularly sensitive to perturbations in core index or diameter.

Thus, there is a need for a non-linear fiber having high non-linearity, a good balance between effective refractive index and wavelength, and low sensitivity/high resistivity to perturbations.

SUMMARY

Embodiments of the present invention generally relate to non-linear fibers resistant to perturbations. More specifically, embodiments of the present invention relate to a fiber design that achieves high nonlinearity, an effective index providing phase matching for an illustrative wavelength conversion process, and a low sensitivity to perturbations in fiber scaling.

In one embodiment of the present invention, a fiber comprises an inner core having an inner core radius and an inner core index, an outer core having an outer core radius and an outer core index, the outer core index being lower than the inner core index, an inner cladding, having an inner cladding radius and an inner cladding index, the inner cladding index being less than the outer core index, and an effective index of the fiber, the effective index being greater than the inner cladding index and less than the outer core index, wherein the fiber has a low perturbation sensitivity factor of dispersion to scaling less than about 20 ps/nm/km along the entire length of the fiber.

As used herein, "perturbation sensitivity factor" (dD/ds) is the rate of change of the dispersion as a function of the radial scaling factor s; that is, for a given unperturbed profile $n_0(r)$, a profile with perturbed radial scaling s throughout the fiber is $n(r)=n_0(r/s)$. The dispersion for such a profile is a function of s, and dD/ds is an important measure of how dispersion may vary in a fiber subject to realistic fabrication variations. Alternative sensitivity metrics may also been used. For example, sensitivity of the zero dispersion wavelength d(ZDW)/ds. Alternate units are sometimes used, for example 0.01*dD/ds is the sensitivity normalized to 1% fluctuation in scaling, and $(1/r_{core})$dD/ds normalizes dD/ds to the same units as $dD/dr_{core}$. Perturbations other than a pure scaling variation could be used as well (e.g. the derivative $dD/dr_{core}$ or $dD/dn_{core}$ taken assuming other radial coordinates are constant).

In another embodiment of the present invention, a non-linear fiber resistant to perturbations comprises an inner core having an inner core radius of between about 0.7 microns to about 1.6 microns and an inner core index, an outer core having an outer core radius of between about 2.2 microns to about 4.0 microns and an outer core index, the ratio of outer core radius to inner core radius being between about 2.4 to about 3.4, and the difference between the inner core index and the outer core index being between about 0.017 to about 0.025, an inner cladding, having an inner cladding radius and an inner cladding index, the difference between the outer core index and the inner cladding index being between about 0.015 to about 0.033, and an effective index of the fiber, the difference between the effective index of the fiber and the inner cladding index being greater than about 0.008, wherein the fiber has a low perturbation sensitivity factor of dispersion to scaling less than about 20 ps/nm/km along the entire length of the fiber.

In yet another embodiment of the present invention, a method of propagating an optical signal through a fiber having high-nonlinearity and low sensitivity to perturbations comprises providing a fiber comprising: an inner core having an inner core radius and an inner core index; an outer core having an outer core radius and an outer core index, the outer core index being lower than the inner core index; an inner cladding, having an inner cladding radius and an inner cladding index, the inner cladding index being less than the outer core index; and an effective index of the fiber, the effective index being greater than the inner cladding index and less than the outer core index; wherein the fiber has a low perturbation sensitivity factor to scaling less than about 20 ps/nm/km along the entire length of the fiber, and wherein the wherein the fiber comprises a small effective area of less than about 20 sq. microns; and propagating an optical signal through the fiber from an input to an output; wherein the optical signal at the output of the fiber is substantially unperturbed from the input.

BRIEF DESCRIPTION OF THE DRAWINGS

So the manner in which the above-recited features of the present invention can be understood in detail, a more particular description of embodiments of the present invention, briefly summarized above, may be had by reference to embodiments, which are illustrated in the appended drawings. It is to be noted, however, the appended drawings illustrate only typical embodiments of embodiments encompassed within the scope of the present invention, and, therefore, are not to be considered limiting, for the present invention may admit to other equally effective embodiments, wherein.

The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including but not limited to. To facilitate understanding, like reference numerals have been used, where possible, to designate like elements common to the figures.

DETAILED DESCRIPTION

Embodiments of the present invention generally relate to non-linear fibers resistant to perturbations. More specifically, embodiments of the present invention relate to a fiber design that achieves high nonlinearity and a low sensitivity to perturbations in fiber scaling.

Generally speaking, embodiments of the present invention may be utilized for a wavelength conversion process requiring phase matching with an effective index. As variations in scaling, variations in dispersion near the zero-dispersion wavelength, and variations in the wavelengths of the phase-matched signal and idler, are all proxies for phase matching variations in a sensitivity analysis, embodiments of the present invention may be utilized to create waveguides that are substantially insensitive to such variations.

As used herein, the term "about" or "approximately," or derivatives thereof, when referencing a numerical value, should be deemed to include within ten percent of such numerical value in either direction. In addition, when such terms are utilized to described absolutes (e.g., zero), the absolute should be deemed to include within one unit of reasonable measurement in either direction, as would ordinarily be used by those of ordinary skill in the art.

Figure 1:
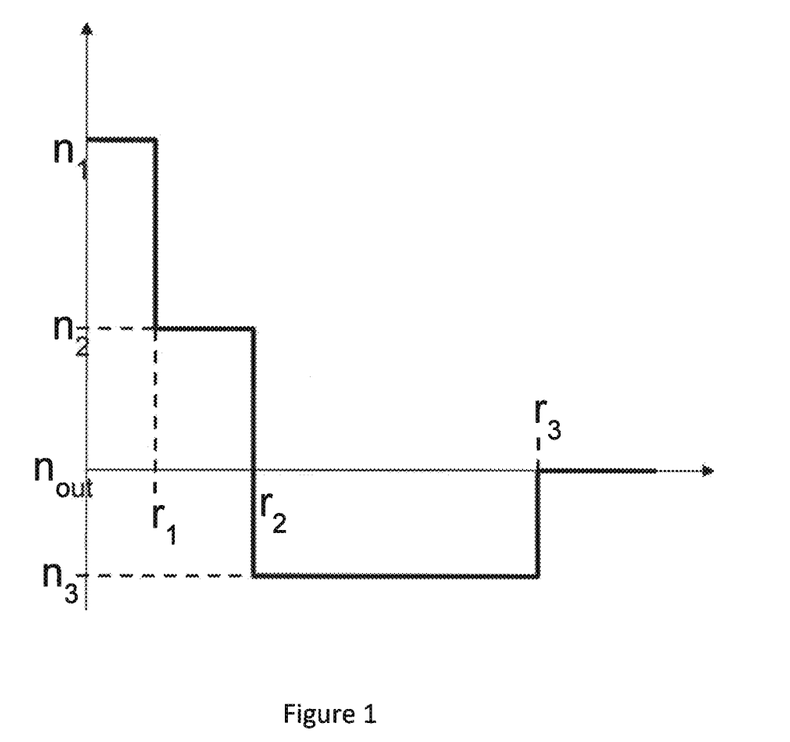
FIG. 1 depicts a graph showing the general fiber design in accordance with one embodiment of the present invention.

FIG. 1 depicts a graph showing a general fiber design in accordance with one embodiment of the present invention. In many embodiments of the present invention, the structure of a fiber generally comprises an inner core, an outer core, an inner cladding (i.e., trench) and an outer cladding. Such sections of the fiber may be designed based upon performance criteria, which may be shown by plotting indexes against radii for the different sections of the fiber as shown in FIG. 1.

In one embodiment, the fiber design comprises an inner core having a radius $r_1$ and an index n, an outer core having a radius $r_2$ and an index $n_2$, a trench with index n3 and extending to radius $r_3$, and an outer cladding having index $n_{out}$. As understood by embodiments of the present invention, the novel fiber designs disclosed herein primarily seek to achieve: (1) a small effective area, i.e., high nonlinearity; and (2) dispersion zero and low variability of the dispersion zero, i.e., low sensitivity to scaling. In accordance with embodiments of the present invention, the small effective area and the dispersion zero may be primarily controlled by the core radii (i.e., $r_1$ and $r_2$) and the net change between the steps (i.e., $n_1$-n2 and $n_2$-$n_3$).

In further embodiments of the present invention, other desirable characteristics of the fiber may also include (continuing the list from above): (3) effectively single mode operation, i.e., low cutoff wavelength or high higher order mode (HOM) loss; (4) low loss at long wavelengths; (5) polarization holding (birefringence), (6) poling of the fiber; (6) specific outer diameter; and (7) special coatings. Many of such characteristics may be controlled by the trench index (i.e., $n_3$), as well as the core radii (i.e., $r_1$ and $r_2$) and the net change between the steps (i.e., $n_1$-$n_2$ and $n_2$-$n_3$). It should be noted, for many embodiments of the present invention, the trench thickness (i.e., $r_3$-$r_2$) is not a notably sensitive parameter per se, but may have a slight impact on all characteristics.

Figure 2:
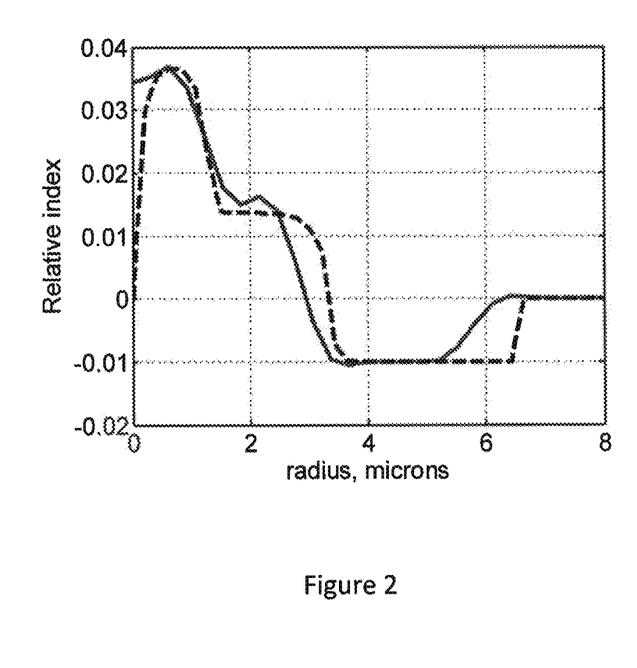
FIG. 2 depicts a graph showing an exemplary embodiment of a fiber design and actual values of a fiber fabricated according thereto, in accordance with embodiments of the present invention.

In view of the above, in an experimental embodiment, a fiber was designed with a relative index profile as discussed above. FIG. 2 depicts the exemplary fiber design and actual values of the fiber fabricated according thereto. According to the Figure, the fiber design is shown in the dashed line, while the actual measured index profile is shown in solid line. The experimental fiber design was obtained by numerical optimization taking into account similar performance considerations as shown and described herein with regard to FIGS. 8-12.

The experimental fiber was drawn such that the radial scaling of the fiber varied along its length from about 1.7 to about 1.95 (i.e., about 13% total variation). From a single preform utilized to make the experimental fiber, additional experimental fibers were created with further variations in scaling, such that their performance characteristics could be measured.

Figure 3:
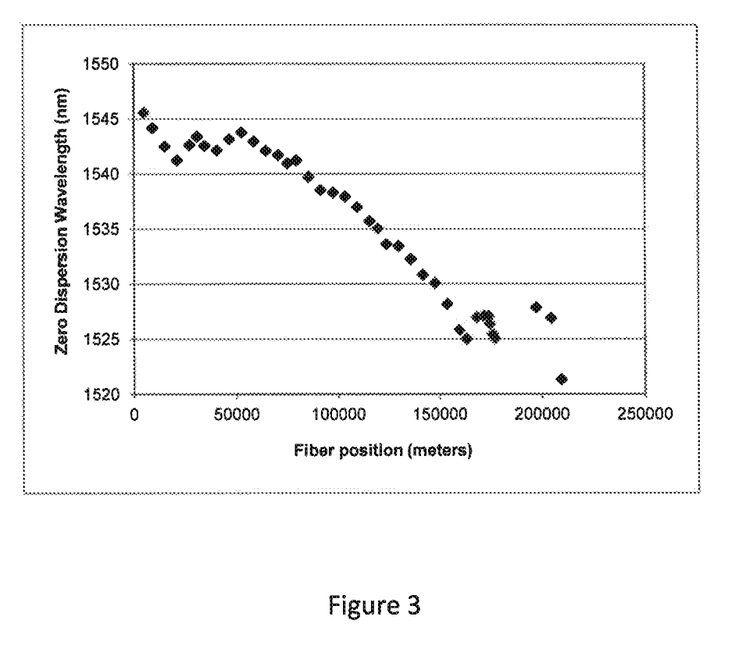
FIG. 3 depicts a graph showing experimental test results for the zero dispersion wavelength as a function of fiber position for an exemplary fiber fabricated in accordance with one embodiment of the present invention.

In accordance with embodiments of the present invention, a number of performance characteristics of the fibers were tested, including the zero dispersion wavelength, as shown in FIG. 3. As understood by embodiments of the present invention, the zero dispersion wavelength is the wavelength or wavelengths at which material dispersion and waveguide dispersion cancel one another, and for which the group delay dispersion is zero. As shown in the Figure, the zero dispersion wavelength decreased as the fiber position increased. Accordingly, when designing a fiber for a particular application in accordance with embodiments of the present invention, a zero dispersion wavelength may be selected by precisely controlling the fiber dimensions.

Figure 4:
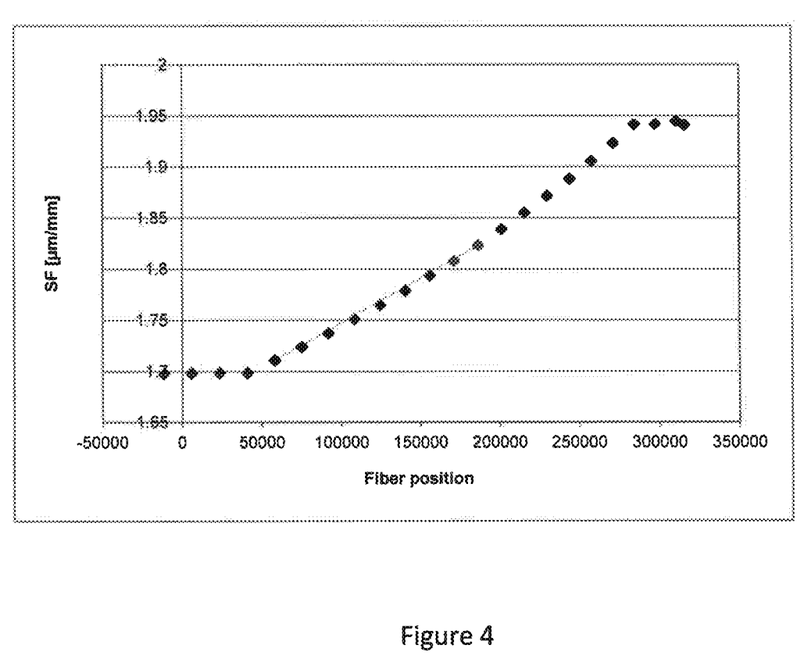
FIG. 4 depicts a graph showing the experimental test results for a scaling factor SF as a function of fiber position for an exemplary fiber fabricated in accordance with one embodiment of the present invention.

As understood by embodiments of the present invention, a fiber index profile is derived from a substantially length-invariant index profile of a preform from which the fiber is formed, scaled by a factor SF. Such factor can be used to estimate the sensitivity of a nominal design (having $SF_0$) to a perturbation $ds=(SF-SF_0)/SF_0$. FIG. 4 depicts a graph showing the experimental test results for a scaling factor SF as a function of fiber position for an exemplary fiber fabricated in accordance with one embodiment of the present invention. As shown in the Figure, a number of measurements were taken along the length (z) of the tested fiber. Between at least about 50 km and about 200 km, the experimental fiber exhibited a substantially linear measurement pattern, which when measured, yielded a slope (ds/dz) of about $4.9 \cdot 10^{-7}$/meter.

Figure 5:
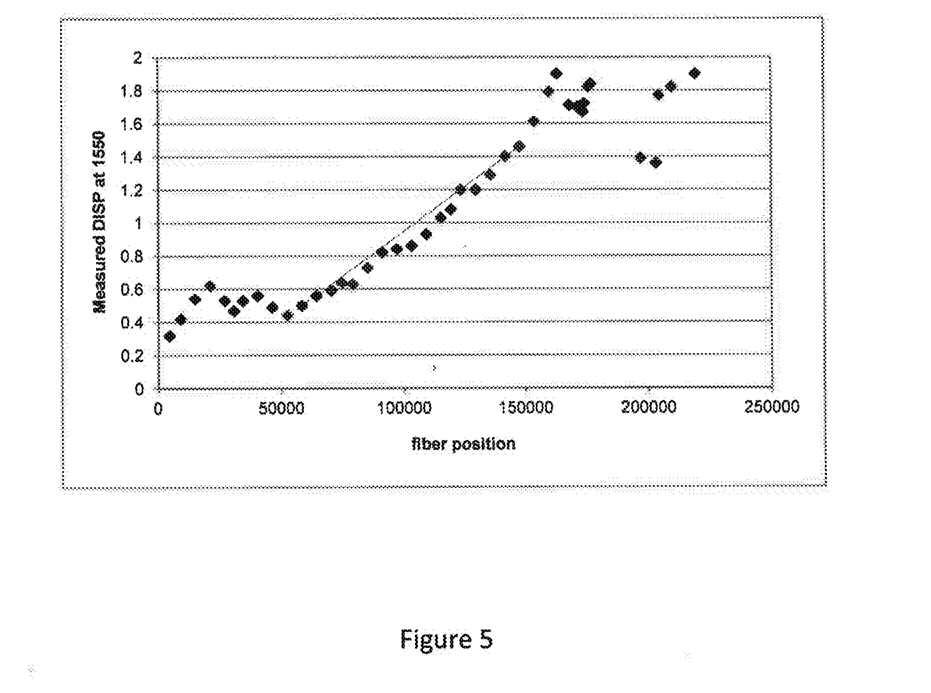
FIG. 5 depicts a graph showing the experimental test results for dispersion, measured at about 1550 nm wavelength, as a function of fiber position for an exemplary fiber fabricated in accordance with one embodiment of the present invention.

In the experimental embodiment, dispersion at about 1550 nm wavelength was also measured as a function of fiber position, as shown in FIG. 5. Similar to the scaling factor SF, a number of measurements were taken along the length (z) of the tested fiber, and between about 50,000 m and about 200,000 m, the experimental fiber exhibited a substantially linear measurement pattern, yielding a slope (dD/dz) of about $1.07 \cdot 10^{-5}$ (ps/nm/km)/meter.

Using these calculations, a "perturbation sensitivity factor" (dD/ds) (i.e., the rate of change of the dispersion as a function of the rate of change of the scaling factor) can be provided as (dD/dz)/(ds/dz) or about 21.8 (ps/nm/km) for the experimental fiber design tested. As understood by embodiments of the present invention, the experimental perturbation sensitivity factor (dD/ds) is substantially smaller than a conventional highly nonlinear fiber, which generally measures greater than about 100 (ps/nm/km). Accordingly, as a lower perturbation sensitivity factor indicates a lower sensitivity to scaling perturbations, the experimental fiber is confirmed to be less sensitive to such perturbations than traditional fibers.

In light of the experimental results using the fiber design explained hereinabove, in accordance with embodiments of the present invention, control over at least two fiber design characteristics should be maintained: the zero dispersion wavelength, and the perturbation sensitivity factor (dD/ds). As both characteristics are dependent upon overall fiber dispersion, either directly or indirectly, control over fiber dispersion is generally relevant as well.

It is understood that dispersion is an important and complicated function of all fiber design parameters. However, for embodiments of the present invention, dispersion is noted as being particularly sensitive to the inner core radius (r1) and the first index step (n1-n2). The outer core radius (r2) and second index step (n2-n3) were also noted as relevant in many embodiments. Thus, by varying the design of the fiber, in particular the radii and the indices, the dispersion of the fiber can be varied as well.

Figure 6:
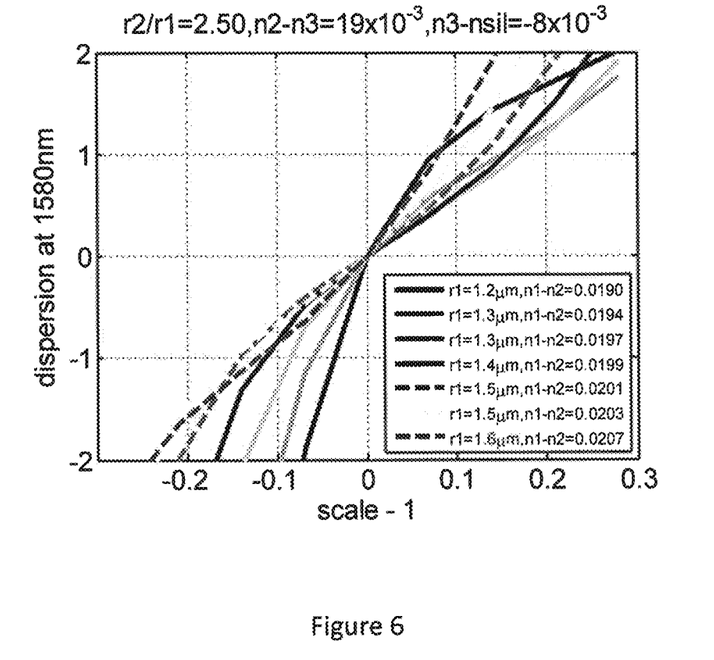
FIG. 6 depicts a graph showing the simulated dispersion, at about 1580 nm wavelength, as a function of scaling, for a range of fiber designs, in accordance with embodiments of the present invention.

FIG. 6 depicts a graph showing the simulated results for dispersion, measured at about 1580 nm wavelength, as a function of scaling, for a range of fiber designs, in accordance with embodiments of the present invention. As shown in the Figure, dispersion is plotted against scaling deviation ds=scaling-1 for several fiber designs, where the inner core parameters (i.e., r1 and n1) are varied to hit zero dispersion at the selected 1580 nm wavelength.

By holding the zero dispersion wavelength constant, as well as the ratio of $r_2/r_1$ and the values of the second step and third step, it is shown that the shape of the curves provided by each design changes quite significantly. The slope of such curves, or dD/ds (i.e., the perturbation sensitivity factor), at the ds=0 is indicative of lower sensitivity perturbations. As shown in the Figure, the lowest of such slopes occurs where $r_1$ is about 1.4 microns, with notably higher slopes at $r_1$ at about 1.2 microns or at about 1.6 microns.

As further understood by embodiments of the present invention, the choice of the r1 values also impacts the effective cutoff of higher order mode (HOM) impact. In the Figure, the lines shown in solid indicate fibers which act as effectively single-moded (i.e., having HOM loss of greater than 10 dB/m at 1450 nm). The dashed lines shown act as multimoded fibers, and for purposes of embodiments of the present invention, are typically undesirable. It is understood the boundary of effective single modedness can be significantly impacted by the $n_3$-$n_{sil}$ parameters, or by adopting a more or less strict HOM loss requirement.

Figure 7:
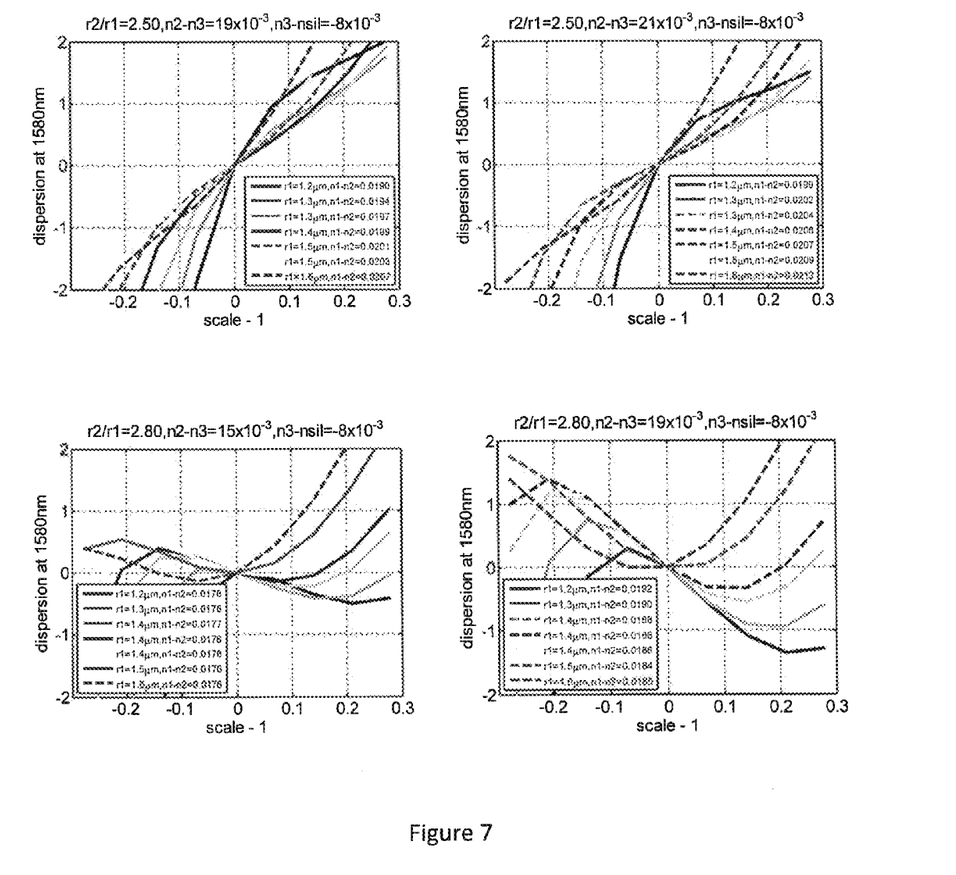
FIG. 7 depicts four graphs showing simulated dispersion, at about 1580 nm wavelength, as a function of scaling, for a range of fiber designs having varying outer core parameters, in accordance with embodiments of the present invention.

Once the impact of the r1 values on dispersion were found, as discussed supra, simulations were conducted to find the impact of outer core parameters $r_2$, and $n_2$-$n_3$. FIG. 7 depicts four graphs showing simulated results for dispersion, measured at about 1580 nm wavelength, as a function of scaling, for a range of fiber designs having varying outer core parameters, in accordance with embodiments of the present invention.

As shown with some designs, the perturbation sensitivity factor can be nearly zero, for example, the curve on the lower left plot of FIG. 7, where $r_1$ is about 1.5 microns, $r_2/r_1$ is about 2.8, and $n_2$-$n_3$ is about 0.015). On such curve, the dispersion is essentially zero where the scale is about 1 (i.e., where the X-axis is at zero, the scale factor is at 1), and the design would likely have an extremely low sensitivity to scale perturbations.

Whereas the outer core parameters (i.e., r2, and n2-n3) have a significant role in determining whether a fiber is effectively single-moded, as discussed above, some of the fiber designs, for example, r1=1.5 in the lower right plot, have very good perturbation sensitivity factors, but would not likely perform well overall due to the high cutoff and related HOM impact. Accordingly, for each intended application, a fiber design must be considered and balanced based on its overall performance characteristics and no one characteristic is likely dispositive of proper fiber design selection.

It should be noted from the results discussed herein, actual fabricated fiber profiles almost always deviate from the intended profile design, for example, as shown in FIG. 2. In many embodiments, such deviation may be compensated for by making adjustments to scaling based on an index profile measurement of a core rod with which the preform is fabricated, or by other suitable means.

While a small perturbation sensitivity factor (dD/ds) may provide a favorable insensitivity to unintentional perturbations, a very small perturbation sensitivity factor may also provide a fiber that is incapable of deviation correction via scaling control. Thus, in one embodiment, a targeted design with the lowest possible perturbation sensitivity factor, i.e., dD/ds=0, may be utilized and if adjustments need to be made to the fiber profile, post-draw processes such as UV tuning, application of strain or annealing may be employed as a method of adjusting the profile of the inner core region. In addition, the fiber tension during draw may be adjusted to induce slight changes in the resulting fiber index profile.

In another embodiment, by utilizing a more moderate perturbation sensitivity factor, for example, where dD/ds is between about 5 to about 10 ps/nm/km, small scaling adjustments could likely be made to correct small deviations in the dispersion or in the zero dispersion wavelength. For such embodiments, an inflected dispersion curve, as shown by numerous fibers in FIG. 7, may be suitable as it shows the fiber provides both a low perturbation sensitivity factor, while allowing room for adjustments via scaling for core rods that slightly deviate from the intended design.

Figure 8:
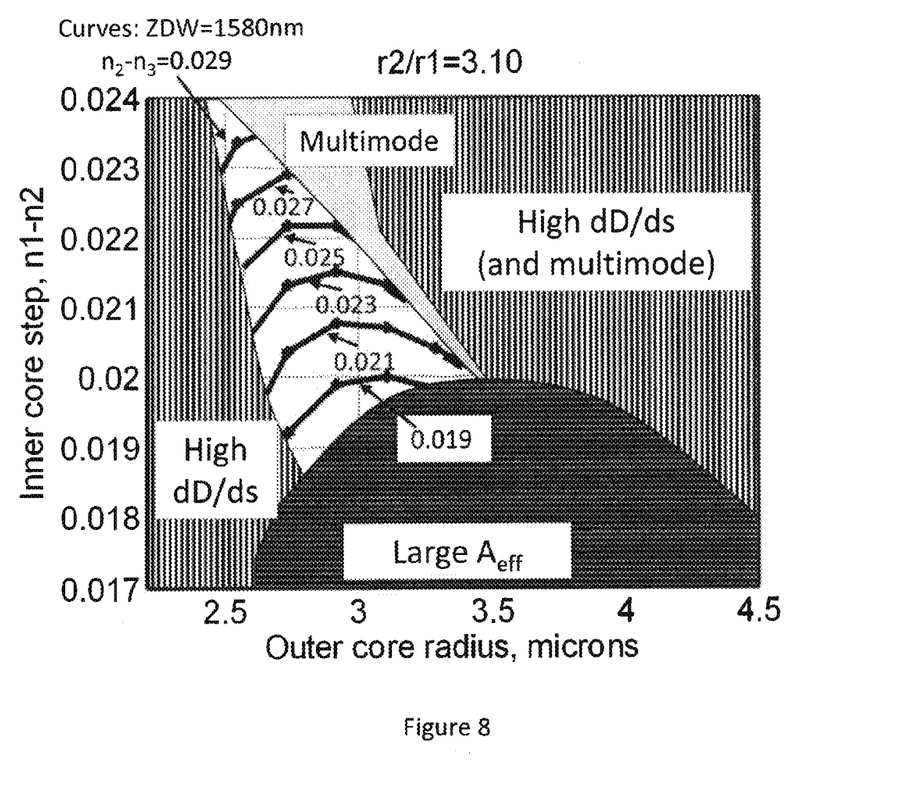
FIG. 8 depicts a design space map showing regions of simulated acceptable performance as a function of inner core index step (n1-n2), and outer core radius, for a range of fiber designs, in accordance with embodiments of the present invention.

In understanding the tradeoff and balance between certain design parameters and others, in order to attain a range for a fiber design "family" (i.e., fibers with properties deemed suitable for various embodiments of the present invention, and applications therefor), design space maps may be created to evaluate properties based on design profiles. FIG. 8 depicts a design space map showing simulated results for a range of fiber designs, in accordance with embodiments of the present invention: the curves indicate the inner core index step ($n_1$-$n_2$) required to achieve an exemplary zero-dispersion wavelength (1580 nm) as a function of the outer core radius, while the shaded regions indicate various performance penalties to be avoided, so that desirable designs are indicated by an unshaded region.

As shown in the Figure, certain variables for the proposed design were held fixed (i.e., $r_2/r_1$=3.1, $n_3$-$n_{out}$=−0.008, and the zero dispersion wavelength is about 1580 nm), and fibers were tested for various $n_2$-$n_3$ values ranging from about 0.017 to about 0.029. The inner core index step ($n_1$-$n_2$) was fine-tuned between about 0.017 and about 0.024 to achieve the desired zero dispersion wavelength as shown with regard to the particular outer core index step ($n_2$-$n_3$) value. The results obtained from the map indicate the suitable range of fiber designs for the proposed application.

For the embodiment shown, a combination of a large outer core radius ($r_2$) and large index steps ($n_1$-$n_2$ and $n_2$-$n_3$) may lead to generally undesirable multimoded fibers (as shown in the Figure as multimode area), and the actual boundary is depicted and defined by $n_3$-$n_{out}$ and other similar factors. The large outer core radius ($r_2$) and small outer core index step ($n_2$-$n_3$) lead to a large effective area, which for the embodiment shown, is also generally undesirable. Both a small outer core radius ($r_2$) and large core radius ($r_2$) leads to a degraded perturbation sensitivity, which is generally undesirable, and which may be explained by the dispersion v. scale graphs shown in FIG. 7. Accordingly, the unshaded portion of the design space map, as shown, may likely yield the most desirable properties for the particular embodiment analyzed, as the fibers therein likely possess: effective single-modedness, a low perturbation sensitivity factor, a low effective area, and the like.

Figure 9:
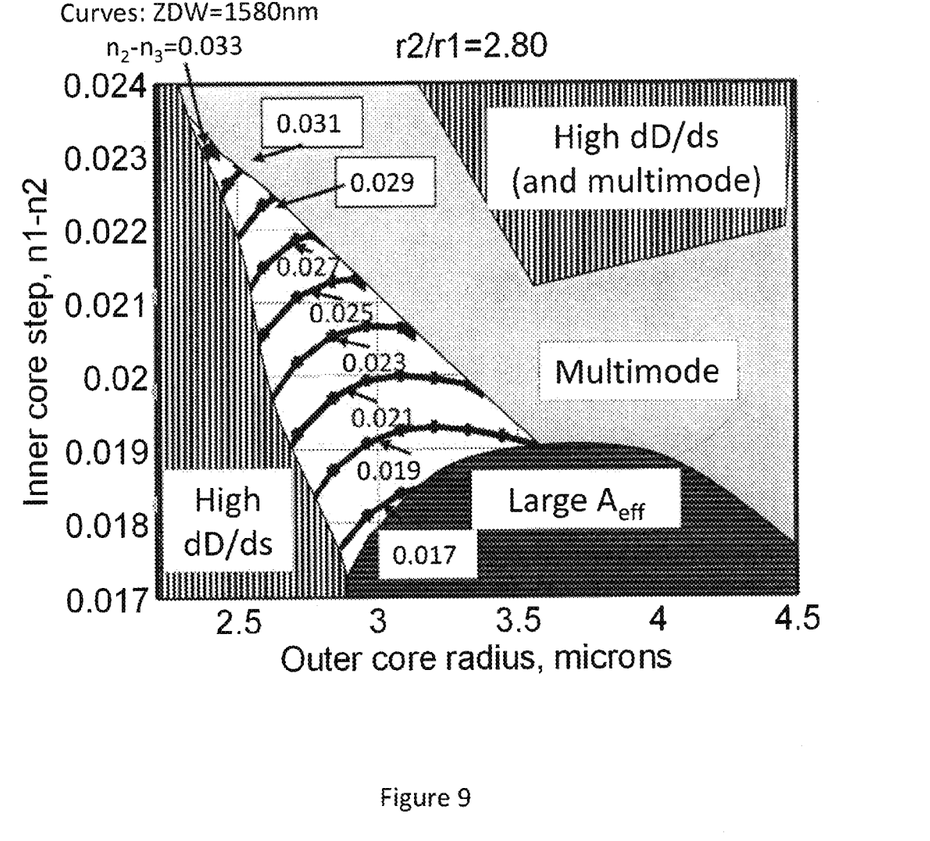
FIG. 9 depicts another design space map showing regions of simulated acceptable performance as a function of inner core index step (n1-n2) and outer core radius, for a different range of fiber designs, in accordance with embodiments of the present invention.

FIG. 9 depicts another design space map showing simulated results for a different range of fiber designs, in accordance with embodiments of the present invention: the curves indicate the inner core index step ($n_1$-$n_2$) required to achieve an exemplary zero-dispersion wavelength (1580 nm) as a function of the outer core radius, while the shaded regions indicate various performance penalties to be avoided, so that desirable designs are indicated by an unshaded region.

Figure 10:
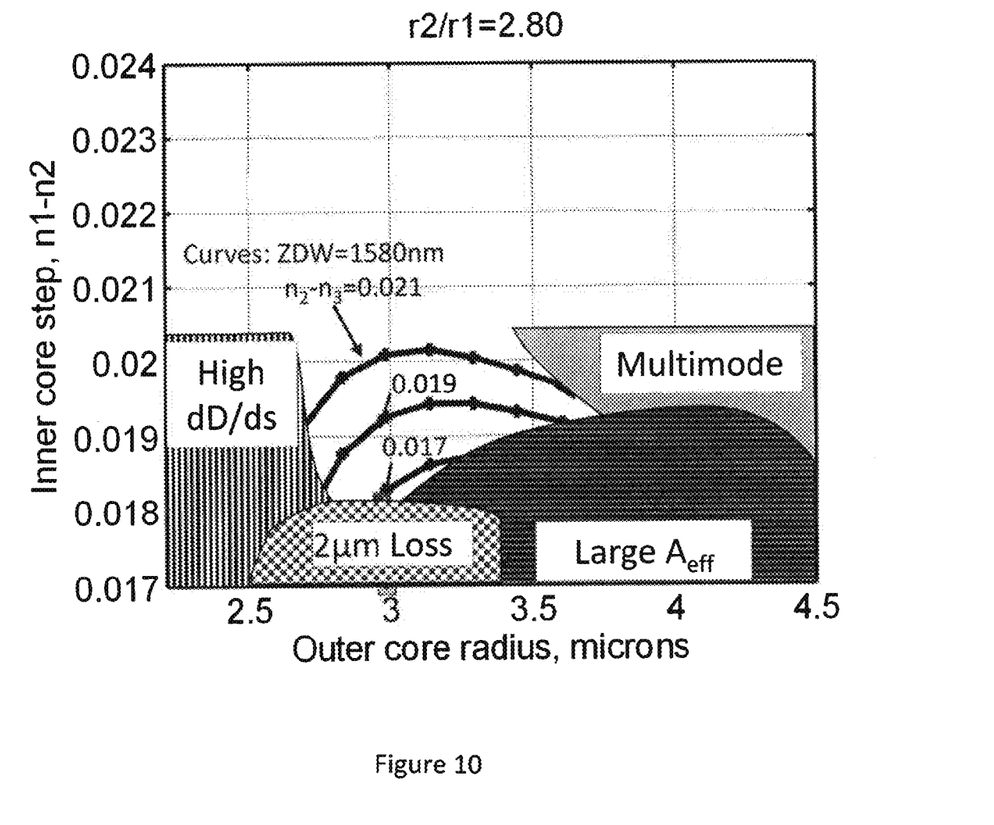
FIG. 10 depicts yet another design space map showing regions of simulated acceptable performance as a function of inner core index step (n1-n2) and outer core radius, for a different range of fiber designs, in accordance with embodiments of the present invention.

In the embodiment shown, the $r_2/r_1$ was held to about 2.8, and the $n_3$-$n_{out}$=−0.008. Similar to the embodiment shown above in FIG. 8, the design space map of FIG. 9 has similar trends, although the suitable designs extend into lower index contrasts, which may generally have lower dopant levels. FIG. 10 depicts yet another design space map showing simulated results for a different range of fiber designs, in accordance with embodiments of the present invention: the curves indicate the inner core index step ($n_1$-$n_2$) required to achieve an exemplary zero-dispersion wavelength (1580 nm) as a function of the outer core radius, while the shaded regions indicate various performance penalties to be avoided, so that desirable designs are indicated by an unshaded region.

In the embodiment shown, the values of the various parameters were largely held constant compared to those shown in FIG. 9 with the difference being the trench depth which was tested at $n_3$-$n_{out}$ fixed at about −0.010. As evident when compared to the design space map of FIG. 9, the embodiment shown exhibits an improvement in the multimode condition as the trench is made deeper, opening up the range of suitable fiber designs. Also evident from the Figure, certain designs may be excluded due to loss at a particular threshold, for example, loss at 2.1 microns exceeds the 10 dB/m threshold. It should be noted, in the Figure shown, data for larger inner core index steps (i.e., greater than about 0.02) was omitted in the interest of computation time, but is expected to yield similar trends.

Figure 11:
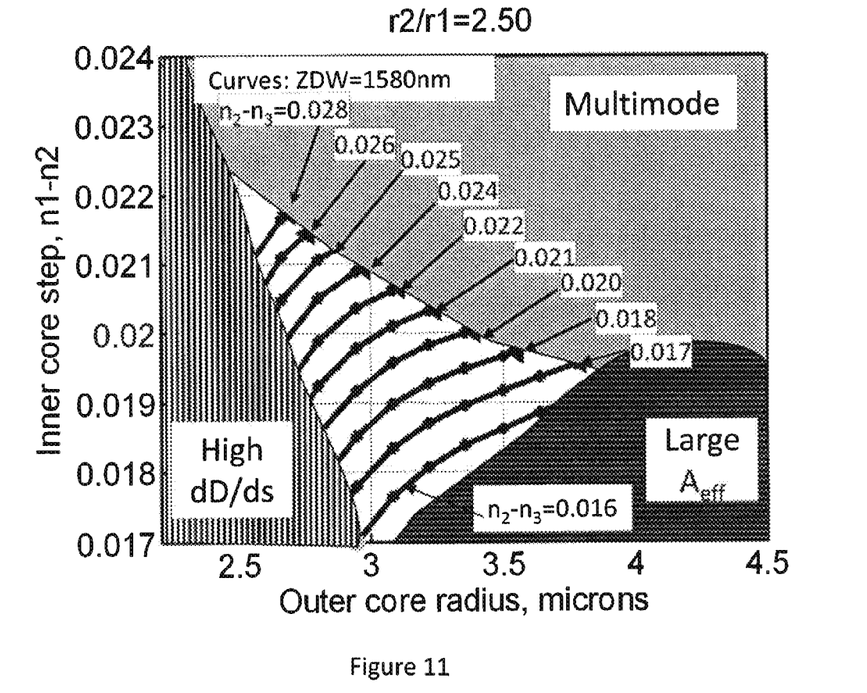
FIG. 11 depicts a further design space map showing regions of simulated acceptable performance as a function of inner core index step (n1-n2) and outer core radius, for a different range of fiber designs, in accordance with embodiments of the present invention.

FIG. 11 depicts a further design space map showing simulated results for a different range of fiber designs, in accordance with embodiments of the present invention: the curves indicate the inner core index step ($n_1$-$n_2$) required to achieve an exemplary zero-dispersion wavelength (1580 nm) as a function of the outer core radius, while the shaded regions indicate various performance penalties to be avoided, so that desirable designs are indicated by an unshaded region. In the embodiment shown, the values of the various parameters were largely held constant compared to those shown in FIGS. 8 and 9 with the difference being $r_2/r_1$=2.5. As evident from the change in ratios for these embodiments, the suitable fibers tend to extend into lower index contrasts, and may have generally lower dopant levels relative to the larger $r_2/r_1$ designs shown in FIGS. 8 and 9. In addition, there is only one high perturbation sensitivity factor region, corresponding to the small core size, as opposed to the two regions in both the other Figures.

It should be noted, however, the designs deemed suitable in FIG. 11 achieve low sensitivity (i.e., a perturbation sensitivity factor less than about 20 ps/nm/km), but none of the designs achieve super low sensitivity (i.e., a perturbation sensitivity factor less than about 4 ps/nm/km). As such, it is noted that $r_2/r_1$ ratios less than about 2.5 can achieve low sensitivity, but not super low sensitivity, which may be desirable in certain embodiments. This is further exemplified by the design space map shown in FIG. 12.

Figure 12:
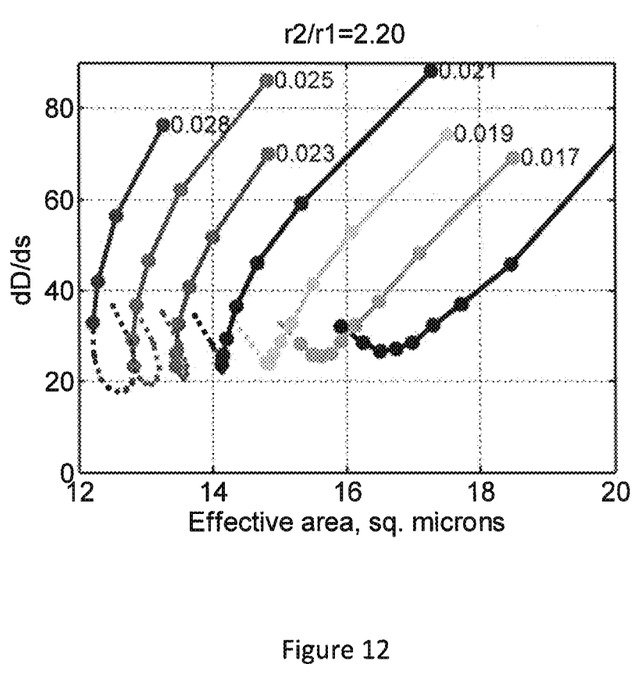
FIG. 12 depicts an additional design space map showing regions of simulated acceptable performance as a function of inner core index step (n1-n2) and outer core radius, for a different range of fiber designs, in accordance with embodiments of the present invention.

FIG. 12 depicts an additional design space map showing showing simulated results for a different range of fiber designs, in accordance with embodiments of the present invention: the curves indicate the inner core index step (n1-n2) required to achieve an exemplary zero-dispersion wavelength (1580 nm) as a function of the outer core radius, while the shaded regions indicate various performance penalties to be avoided, so that desirable designes are indicated by an unshaded region. In particular, the Figure depicts fibers designed similar to those shown in FIGS. 8, 9 and 11, having a large $r_2/r_1$ value of about 3.4. While there were certain fiber designs that yielded suitable properties, it should be noted that such a high $r_2/r_1$ value required an excessive dopant concentration in order to fabricate such fibers. In accordance with embodiments of the present invention, such high dopant concentrations are generally undesirable as they generally lead to fibers with excess loss, difficulty in fabrication, etc.

Figure 13:
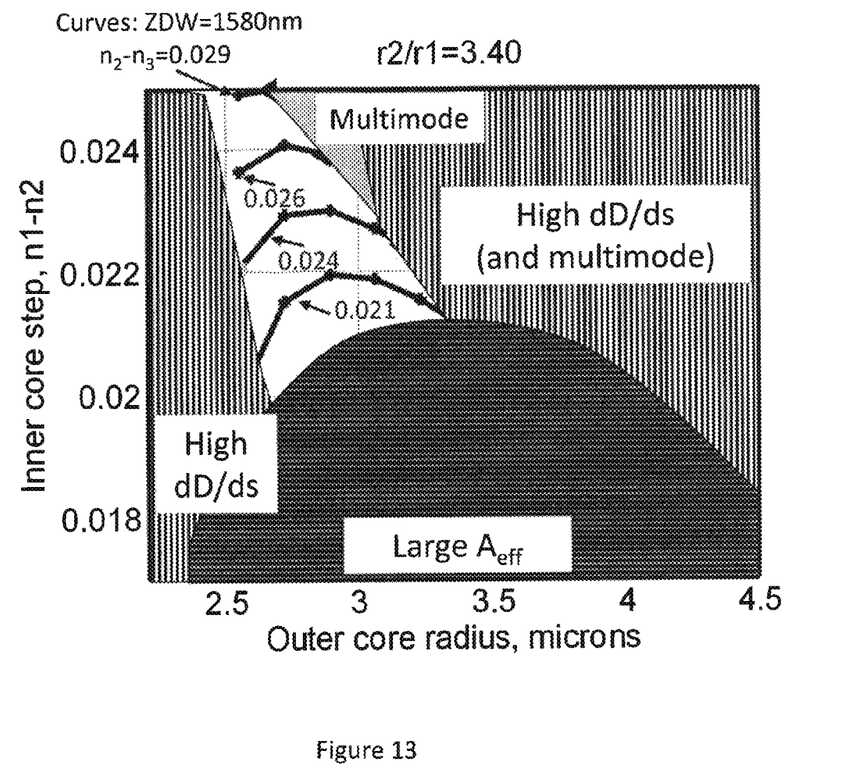
FIG. 13 depicts an additional design space map showing simulated perturbation sensitivity factor, as a function of the effective area, for a different range of fiber designs, in accordance with embodiments of the present invention.

FIG. 13 depicts an additional design space map showing simulated perturbation sensitivity factor, as a function of the effective area, for a different range of fiber designs, in accordance with embodiments of the present invention. In the embodiment depicted, a low $r_2/r_1$ value of 2.2 was selected. As expected from FIG. 11 above, none of the fiber designs shown in FIG. 12 have a perturbation sensitivity factor less than 20 ps/nm/km. In addition, it is noted that for the fiber designs tested, each of the fibers having a perturbation sensitivity factor near 20 ps/nm/km were multimoded in such range (indicated by dotted curves). As such, while the fiber designs shown have moderately good overall performance, with lower sensitivity to perturbations than conventional designs, they are not necessarily the ideal fiber designs for many applications contemplated by embodiments of the present invention. Accordingly, attention is shifted back towards higher $r_2/r_1$ values, as shown in FIG. 12.

Thus, in view of the results, as discussed herein, many embodiments of the present invention may generally be guided with certain numerical parameters in creating a suitable fiber design, as follows:

In many embodiments of the present invention, the inner core radius (r1) may be between about 0.7 microns to about 1.6 microns. In one embodiment, the inner core radius (r1) is between about 1.1 microns to about 1.4 microns. In many embodiments, the outer core radius (r2) may be between about 2.2 microns to about 4.0 microns. In one embodiment, the outer core radius (r2) is between about 2.5 microns to about 3.8 microns. Thus, the ratio of outer core radius to inner core radius (r2/r1), in many embodiments, may be greater than about 2.0. In one embodiment, the ratio of outer core radius to inner core radius (r2/r1) is between about 2.4 to about 3.4.

The first index step (n1-n2) may generally be in the range of between about 0.017 to about 0.025. In one embodiment, the first index step (n1-n2) is between about 0.018 and about 0.022. The second index step (n2-n3) may generally be in the range of between about 0.015 to about 0.033. In one embodiment, the second index step (n2-n3) is between about 0.016 to about 0.030.

Generally, the trench depth ($n_{out}$-n3) should be greater than about 0.004 to improve the single-modedness of the fiber design. In some embodiments, the trench depth ($n_{out}$-n3) is greater than about 0.008. In one particular embodiment, the trench depth ($n_{out}$-n3) is about 0.010.

The resulting fiber designs, made in accordance with embodiments of the present invention, have a small effective area (i.e., high nonlinearity), and low sensitivity to perturbations, in particular, scaling. Generally, such fibers comprise a small effective area of less than about 20 sq. microns, and have a perturbation sensitivity factor of less than about 25 ps/nm/km. In some embodiments, the small effective area is less than about 15 sq. microns, and the perturbation sensitivity factor is less than about 10. In further embodiments, the perturbation sensitivity factor is less than about 4.

In addition to the applications presented herein, embodiments of the present invention may also be deemed suitable for fibers having additional variations as a function of fiber length. For example, fibers experiencing other perturbations such as temperature, mechanical forces, chemical variations in the environment, spins or twists in the fiber, management of bends in a cable or coil, etc., may benefit from the disclosure herein.

In particular, embodiments of the present invention may be suitable in conjunction with methods for managing unwanted stimulated Brillouin scattering (SBS). That is, SBS is sometimes mitigated by introducing perturbations (temperature or strain) to the fiber, but these perturbations can also cause undesirable variations in the dispersion (e.g., variations in the zero dispersion wavelength along the fiber). By utilizing embodiments of the present invention, a fiber may be provided having a zero dispersion wavelength insensitive to any such perturbations. As such, it is evident in further embodiments of the present invention, fibers made in accordance with the disclosure herein may be resistant to numerous other perturbations, in addition to scaling perturbations. For any such perturbation intended to be targeted by the designs herein, similar methodology may be followed for creating a fiber design suitable for such application, and suitable ranges may be determined for the two-step core and trench, allowing independent adjustment of cutoff, mode size and dispersion therewith.

The insensitivity of the zero dispersion to strain has been confirmed by measurements. Measurement results are found in Table 1 below:

TABLE 1

| | | Conventional HNLF | HNLF according to this invention |
|---|---|---|---|
| SBS frequency shift versus strain | GHZ/kg | 0.32 | 0.31 |
| Dispersion versus strain | ps/(nm · km · kg) | −0.72 | −0.05 |
| Zero dispersion wavelength versus strain | nm/kg | 64 | 0.4 |

The HNLF according to this invention has the same sensitivity for the SBS shift due to straining as conventional HNLF, which is good for application where SBS suppression is done by spooling the fiber with a strain gradient. However, the sensitivity to dispersion due to straining is much reduced especially the improvement for the sensitivity for the ZDW is quite large.

In additional embodiments of the present invention, an alternative to focusing on the goal of low sensitivity for fiber design is to utilize the design parameters set forth herein, and design such a fiber having a $r_2/r_1$ value greater than or equal to about 2.5. As shown in the Figures herein, such a minimum ratio yields desirable performance characteristics in various applications.

While the foregoing is directed to embodiments of the present invention, other and further embodiments of the invention may be devised without departing from the basic scope thereof. It is also understood that various embodiments described herein may be utilized in combination with any other embodiment described, without departing from the scope contained herein. In addition, embodiments of the present invention may be further scalable, as particular applications may require.

What is claimed is:

1. A fiber comprising:
    an inner core having an inner core radius and an inner core index;
    an outer core having an outer core radius and an outer core index, the outer core index being lower than the inner core index, wherein the outer core radius is between about 2.5 microns to about 3.8 microns;
    an inner cladding, having an inner cladding radius and an inner cladding index, the inner cladding index being less than the outer core index; and
    an effective index of the fiber, the effective index being greater than the inner cladding index and less than the outer core index;
    wherein the fiber has a low perturbation sensitivity factor to scaling less than about 20 ps/nm/km along the entire length of the fiber;
    wherein the difference between the effective index of fiber and the inner cladding index is about 0.010;
    wherein the difference between the inner core index and the outer core index is between about 0.018 and about 0.022; and
    wherein the fiber comprises a small effective area is less than about 15 sq. microns, and the perturbation sensitive factor to scaling is less than about 4.

2. The fiber of claim 1, wherein the inner core radius is between about 0.7 microns to about 1.6 microns.

3. The fiber of claim 2, wherein the inner core radius is between about 1.1 microns to about 1.4 microns.

4. The fiber of claim 1, wherein the ratio of outer core radius to inner core radius is greater than about 2.0.

5. The fiber of claim 4, wherein the ratio of outer core radius to inner core radius is between about 2.4 to about 3.4.

6. The fiber of claim 1, wherein the difference between the outer core index and the inner cladding index is between about 0.015 to about 0.033.

7. The fiber of claim 6, wherein the difference between the outer core index and the inner cladding index is between about 0.016 to about 0.030.

8. A non-linear fiber resistant to perturbations comprising:
    an inner core having an inner core radius of between about 0.7 microns to about 1.6 microns and an inner core index;
    an outer core having an outer core radius of between about 2.5 microns to about 3.8 microns and an outer core index, the ratio of outer core radius to inner core radius being between about 2.4 to about 3.4, and the difference between the inner core index and the outer core index being between about 0.018 to about 0.022;
    an inner cladding, having an inner cladding radius and an inner cladding index, the difference between the outer core index and the inner cladding index being between about 0.015 to about 0.033; and
    an effective index of the fiber, the difference between the effective index of the fiber and the inner cladding index being about 0.010;
    wherein the fiber has a low perturbation sensitivity factor to scaling less than about 20 ps/nm/km along the entire length of the fiber; and
    wherein the fiber comprises a small effective area is less than about 15 sq. microns, and the perturbation sensitivity factor to scaling is less than about 4.

9. A method of propagating an optical signal through a fiber having high-nonlinearity and low sensitivity to perturbations comprising:
    providing a fiber comprising:
        an inner core having an inner core radius and an inner core index;
        an outer core having an outer core radius and an outer core index, the outer core index being lower than the inner core index;
        an inner cladding, having an inner cladding radius and an inner cladding index, the inner cladding index being less than the outer core index; and
        an effective index of the fiber, the effective index being greater than the inner cladding index and less than the outer core index;
        wherein the fiber has a low perturbation sensitivity factor to scaling less than about 20 ps/nm/km along the entire length of the fiber, and wherein the wherein the fiber comprises a small effective area of less than about 15 sq. microns wherein the difference between the effective index of the fiber and the inner cladding index is about 0.010;
        wherein the difference between the inner core index and the outer core index is between about 0.018 and about 0.022; and
    propagating an optical signal through the fiber from an input to an output;
    wherein the optical signal at the output of the fiber is substantially unperturbed from the input.

* * * * *